(12) United States Patent
Park et al.

(10) Patent No.: US 11,178,322 B2
(45) Date of Patent: Nov. 16, 2021

(54) CAMERA MODULE AND AUTOMOBILE

(71) Applicant: LG INNOTEK CO., LTD., Seoul (KR)

(72) Inventors: Jong Hyun Park, Seoul (KR); Sung Deok Moon, Seoul (KR); Ok Hyeon Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/498,050

(22) PCT Filed: Mar. 30, 2018

(86) PCT No.: PCT/KR2018/003822
§ 371 (c)(1),
(2) Date: Sep. 26, 2019

(87) PCT Pub. No.: WO2018/182374
PCT Pub. Date: Oct. 4, 2018

(65) Prior Publication Data
US 2020/0106935 A1 Apr. 2, 2020

(30) Foreign Application Priority Data
Mar. 30, 2017 (KR) .................. 10-2017-0041099

(51) Int. Cl.
*H04N 5/225* (2006.01)
(52) U.S. Cl.
CPC ......... *H04N 5/2257* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| 10,660,204 B2* | 5/2020 | Kim ................. H05K 1/028 |
| 10,681,251 B2* | 6/2020 | Park ................. G03B 17/02 |
| 2013/0293771 A1 | 11/2013 | Mori et al. |
| 2014/0253735 A1* | 9/2014 | Fox ................. H04M 1/0264 |
| | | 348/164 |

(Continued)

FOREIGN PATENT DOCUMENTS

| CN | 103439849 A | 12/2013 |
| CN | 204795307 U | 11/2015 |

(Continued)

OTHER PUBLICATIONS

International Search Report dated Jul. 5, 2018 issued in Application No. PCT/KR2018/003822.

(Continued)

*Primary Examiner* — James M Hannett
(74) *Attorney, Agent, or Firm* — KED & Associates LLP

(57) ABSTRACT

An embodiment of the present invention relates to a camera module and an automobile comprising the same, the camera module comprising: a first housing in which a lens module is disposed; a second housing including a base and a support portion extending upward from the base; and a substrate on which an image sensor is mounted and which is disposed on the support portion, wherein the substrate and the support portion are disposed in the first housing.

20 Claims, 6 Drawing Sheets

(56) References Cited

U.S. PATENT DOCUMENTS

| | | | |
|---|---|---|---|
| 2014/0320657 A1* | 10/2014 | Han | H04N 5/2254 |
| | | | 348/148 |
| 2015/0103240 A1 | 4/2015 | Kim et al. | |
| 2016/0074724 A1* | 3/2016 | Terre | G01S 17/88 |
| | | | 356/4.01 |
| 2016/0268716 A1* | 9/2016 | Conger | H04N 7/18 |
| 2017/0192340 A1* | 7/2017 | Warren | G03B 17/08 |
| 2017/0201661 A1* | 7/2017 | Conger | H04N 5/2252 |
| 2019/0170920 A1* | 6/2019 | Park | H04N 5/225 |
| 2020/0154020 A1* | 5/2020 | Byrne | H04N 5/2257 |
| 2020/0169648 A1* | 5/2020 | Percival | H04N 5/2252 |

FOREIGN PATENT DOCUMENTS

| | | |
|---|---|---|
| CN | 105959522 A | 9/2016 |
| KR | 10-2010-0002614 | 1/2010 |
| KR | 10-2011-0030855 | 3/2011 |
| KR | 10-2012-0003036 | 1/2012 |
| KR | 10-2015-0044363 | 4/2015 |
| KR | 10-2015-0142194 | 12/2015 |

OTHER PUBLICATIONS

Extended European Search Report dated Nov. 2, 2020 issued in Application 18775383.5.
Chinese Office Action dated Dec. 31, 2020 issued in Application 201880022748.8.

* cited by examiner

CAMERA MODULE AND AUTOMOBILE

CROSS-REFERENCE TO RELATED PATENT APPLICATIONS

This application is a U.S. National Stage Application under 35 U.S.C. § 371 of PCT Application No. PCT/KR2018/003822, filed Mar. 30, 2018, which claims priority to Korean Patent Application No. 10-2017-0041099, filed Mar. 30, 2017, whose entire disclosures are hereby incorporated by reference.

TECHNICAL FIELD

The present embodiment relates to a camera module and an automobile.

BACKGROUND ART

The following description provides background information for the present exemplary embodiment and does not describe the prior art.

Camera modules that photograph a subject as a photo or movie can be combined with various devices and apparatuses. Particularly, due to the advancement and automation of vehicle parts, automobiles in which camera modules are combined are introduced to the market. The camera modules are used in the automobiles as being installed inside the front and rear surveillance cameras, a black box and the like.

Since the camera module for the vehicle is exposed to the outside, it is necessary to protect the internal electrical components and fix the electrical components so that they do not fluctuate by external force. Generally, electrical components are fixed by screws, but screw fixing methods have a problem that unit cost is high and the process becomes complicated.

DETAILED DESCRIPTION OF THE INVENTION

Technical Subject

In the present embodiment, it is intended to provide a camera module capable of fixing internal electrical components without using a screw fixing method.

Technical Solution

The camera module of the present embodiment includes: a first housing in which a lens module is disposed; a second housing including a base and a support portion extending upward from the base; and a substrate on which an image sensor is mounted and which is disposed on the support portion, wherein the substrate and the support portion may be disposed inside the first housing.

The upper end portion of the support portion may be in contact with the lower surface of the substrate.

The support portion may further comprise a corner part on which the edge of the substrate is seated, and the lower surface of the substrate and the corner part may be in contact with each other.

The support portion comprises: a first support plate extending upward from the base; and a second support plate extending upward from the base and disposed inclinedly with the first support plate, wherein the corner part may comprise a first edge disposed between the first support plate and the second support plate.

The support portion may further comprise a first guide portion and a second guide portion which are located outside the first edge and extended upward from the base, and the first guide portion and the second guide portion may be inclined with respect to the first edge.

A hook part formed to be higher than the support portion and having a first hook disposed at an end thereof is further included, wherein the first hook may be in contact with the upper surface of the substrate.

The hook part may be disposed closer to the edge of the base than the support portion.

The substrate may be disposed between the first hook and the support portion.

A plurality of hook parts may be disposed so as to surround each of the side surfaces of the substrate.

The automobile of the present embodiment comprises a body; one or more of doors mounted to the body; a display unit disposed inside the body; and a camera module disposed in at least one of the body or at least one of the doors and electrically connected to the display unit, wherein the camera module comprises: a first housing in which a lens module is disposed; a second housing including a base and a support portion extending upward from the base; and a substrate on which an image sensor is mounted, the substrate disposed above the support, and wherein the substrate and the support portion may be disposed inside the first housing.

Advantageous Effects

In the present embodiment, the substrate (electrical component) is fixed to the support portion of the second housing, and the support portion is disposed inside the first housing and protected thereby. By fixing the substrate without using a screw method, there is an advantage in production cost and processing, and the substrate can be stably fixed by the structure of the support portion. Further, an automobile comprising such a camera module is provided.

BEST MODE

Figure 1:
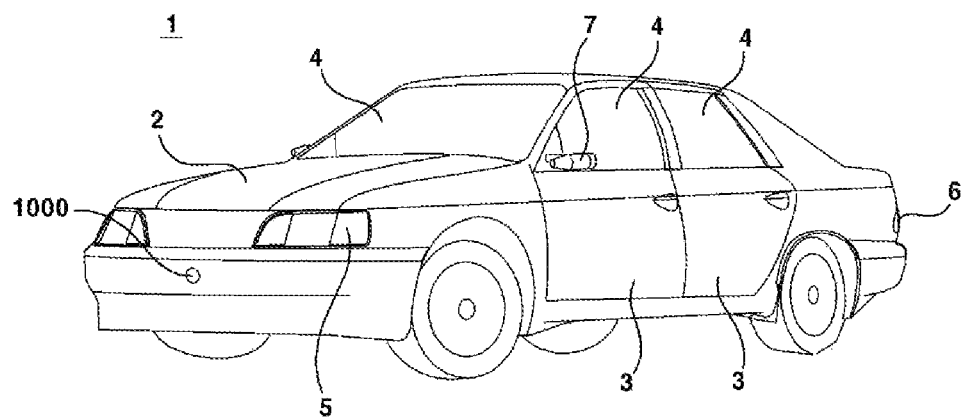
FIG. 1 is a perspective view of an automobile of the present embodiment.

Hereinafter, some embodiments of the present invention will be described with reference to exemplary drawings. In describing the reference symbols of the components in the drawings, the same components are denoted by the same reference numerals whenever possible, even if they are shown on other drawings.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected," "coupled," or "jointed" to another component, the component may be directly connected, coupled, or jointed to the other component, however, it should be understood that another element may be "connected," "coupled" or "jointed" between components.

Figure 3:
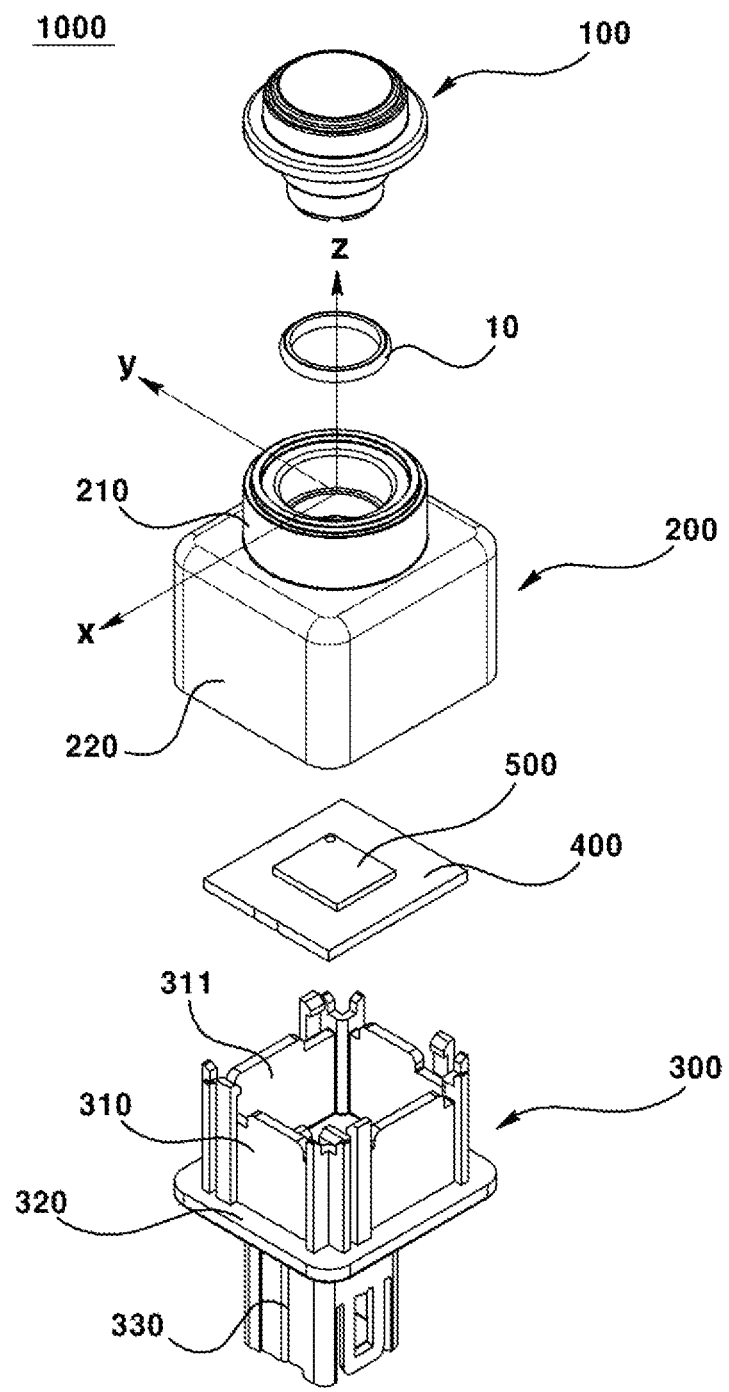
FIG. 3 is an exploded view of the camera module of the present embodiment.

Hereinafter, the "z-axis direction" shown in FIG. 3 is defined as "vertical direction." In this case, the "z-axis arrow direction" is the "upper direction." The "z-axis direction" can be mixed with the "optical axis direction," and the "optical axis" means the optical axis of the lens module 100.

Hereinafter, the automobile of the present embodiment will be described with reference to the drawings. FIG. 1 is a perspective view of an automobile of the present embodiment.

An automobile 1 of the present embodiment may comprise a body 2, a door 3, a glass 4, a head lamp 5, a tail lamp 6, a side mirror 7, and a camera module 1000 have.

The body 2 may be an exterior member of the automobile 1. The body 2 may have various shapes such as a frame type, a monocoque type, and the like. One or more doors 3 can be coupled to the side surface of the body 2. In addition, the glass 4 can be coupled to the front and rear portions (the portion where the pillars are formed) and the door 3 of the upper portion of the body 2. The headlamp 5 can be mounted on the front of the body 2. The tail lamp 6 can be mounted on the rear of the body 2.

The headlamp 5 can illuminate the front of the automobile 1. The head lamps 5 may be present on the right side and the left side of the automobile 1, respectively. The rear lamp 6 can illuminate the rear of the automobile 1. The rear lamps 6 may be present on the right side and the left side of the automobile 1, respectively.

A camera module 1000 of the present embodiment can be mounted on the automobile 1. Therefore, the camera module 1000 of this embodiment can be referred to as a "car camera."

The camera module 1000 may be installed on at least one among the side portion of the body 2 or the one or more doors 3. That is, a camera module 200 of the present embodiment may be installed on the front, rear, and side of the body 2 and on one or more doors 3.

For example, the camera module 1000 may be installed on a front portion (a grille, an emblem, a bumper, and the like) of the body 2, a side portion (a side outer, a garnish, or the like) of the body 2, and a rear portion (a trunk, an emblem, a garnish, a bumper, and the like) of the body 2.

The camera module 1000 may be installed in front of the glass 4 coupled to the door 3. Therefore, the side mirror 7 of the automobile 1 can be replaced with the camera module 1000.

The camera module 1000 may be installed inside the automobile 1. In this case, the camera module 1000 can perform a black box function for photographing the inside of the automobile 1.

The image photographed by the camera module 1000 may be electrically connected to a display unit (not shown) in the automobile 1 through an electronic control unit (ECU) or the like. The image photographed by the camera module 200 can be controlled by the electronic control unit (ECU) and reproduced on the display unit.

The electronic control unit can be mounted as an electrical component in the automobile 1. However, the present invention is not limited to this, and the electronic control unit may be mounted inside the camera module 1000.

An internal space (room) for the driver may be formed inside the automobile 1. A display unit may be installed in a center fascia (not shown) in the automobile 1. The display unit can output an image captured by the camera module 1000.

Figure 2:
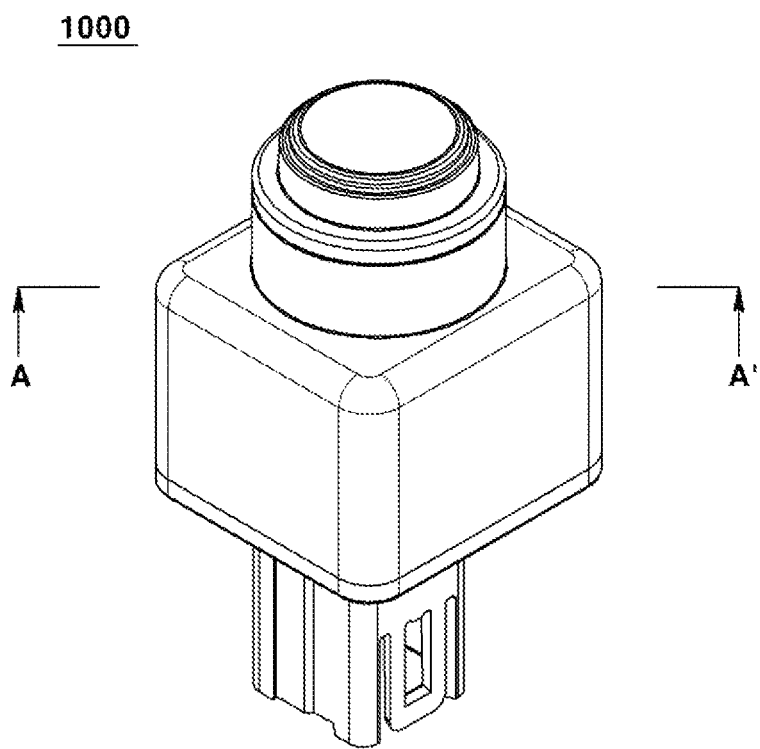
FIG. 2 is a perspective view of the camera module of the present embodiment.
Figure 4:
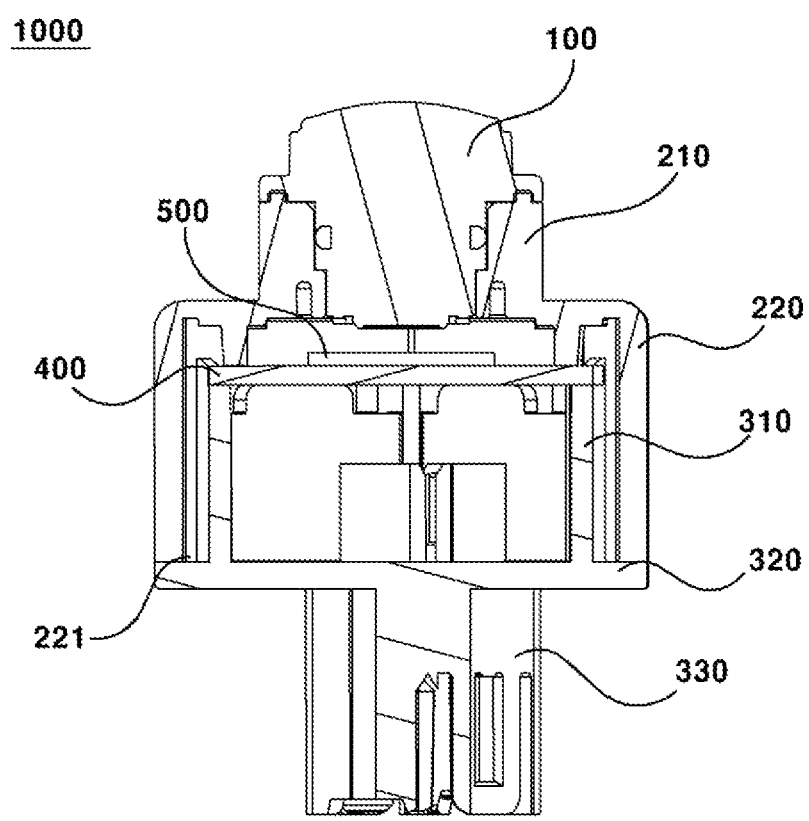
FIG. 4 is a cross-sectional view of the camera module of the present embodiment.
Figure 5:
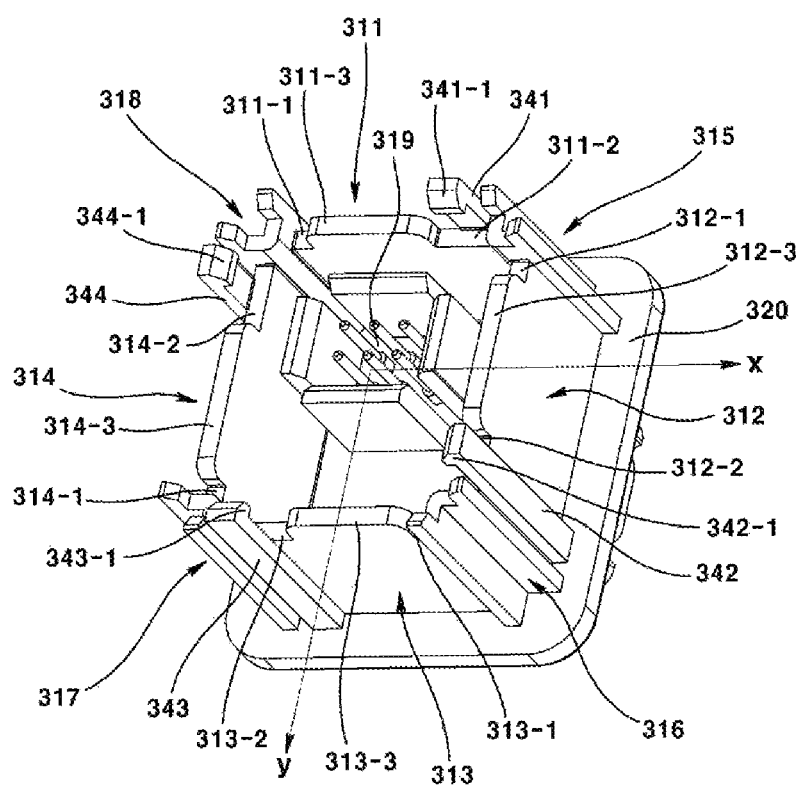
FIG. 5 is a perspective view of the second housing of the present embodiment.
Figure 6:
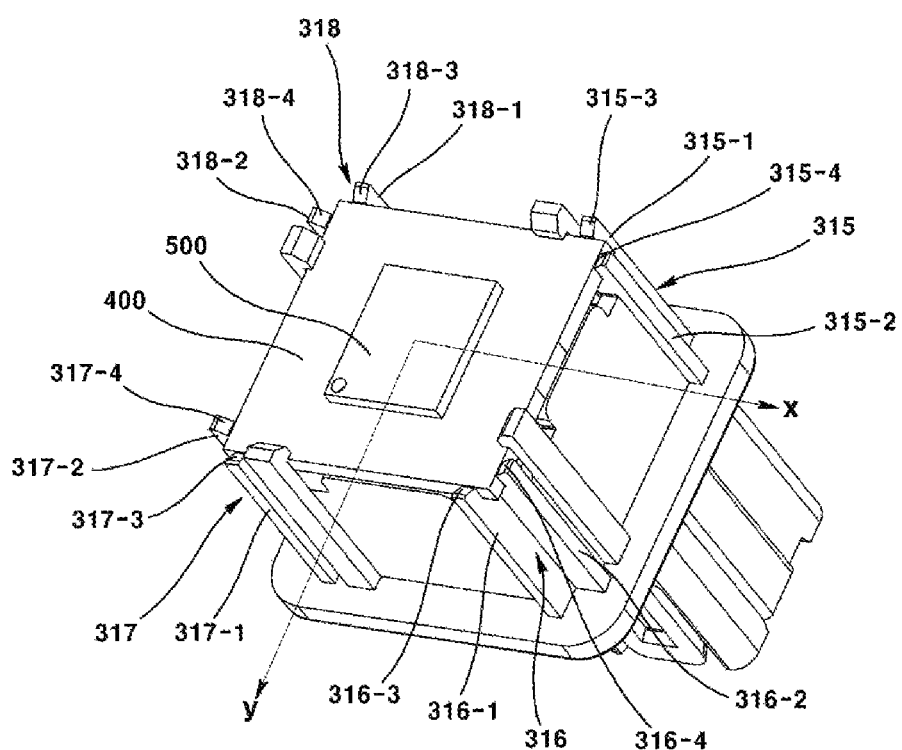
FIG. 6 is a perspective view of the second housing, the substrate, and the image sensor of the present embodiment.
Figure 7:
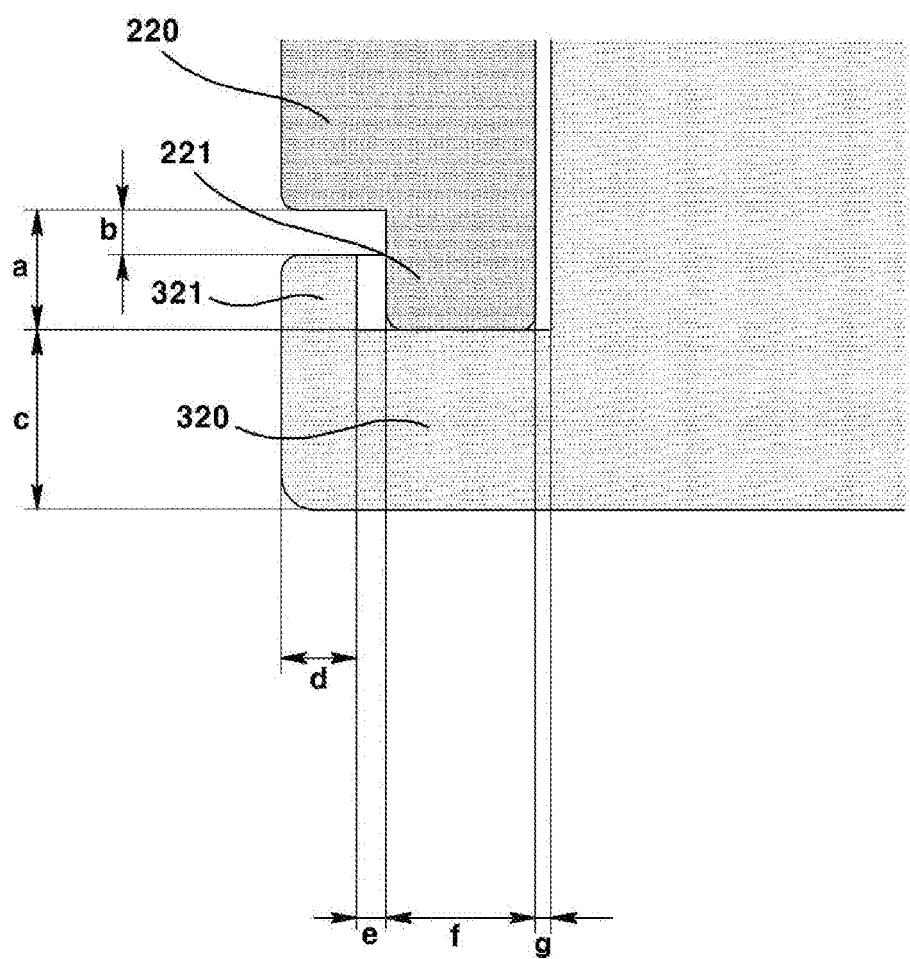
FIG. 7 is a conceptual view showing the camera module of the present embodiment being fusion welded.

Hereinafter, the camera module 1000 of the present embodiment will be described with reference to the drawings. FIG. 2 is a perspective view of a camera module of the present embodiment, FIG. 3 is an exploded view of a camera module of the present embodiment, FIG. 4 is a cross-sectional view of a camera module of the present embodiment, FIG. 5 is a perspective view of a second housing of the present embodiment, FIG. 6 is a perspective view of a second housing, a substrate, and an image sensor of this embodiment, and FIG. 7 is a conceptual view showing the camera module of this embodiment being fused. The camera module 1000 of the present embodiment may comprise a lens module 100, a first housing 200, a second housing 300, a substrate 400, and an image sensor 500.

Hereinafter, a lens module 100 of the present embodiment will be described with reference to FIGS. 2, 3, and 4. The lens module 100 may be disposed in the first housing 200. The lens module 100 may be mounted on a lens holder 210 formed on the upper surface of a main body 220 of the first housing. The lens module 100 and the lens holder 210 may be coupled with each other through an adhesive, or may be threaded and screw-coupled. A gasket 10 may be interposed between the lens module 100 and the lens holder 210 to maintain the airtightness inside the first housing 200.

The lens module 100 may comprise one or more optical lenses. The plurality of optical lenses may be arranged in the vertical direction with their optical axes aligned. The plurality of optical lenses may be directly mounted on the lens holder 210, or may be accommodated in a lens barrel and mounted on the lens holder 210. The plurality of optical lenses and the lens barrel may be coupled through an adhesive, or may be threaded and screw-coupled.

The lens disposed at the outermost (uppermost) side of the lens module 100 may be exposed to the outside. The external light reflected by a subject can be incident on the outermost lens of the lens module 100. The external light may be transmitted through the lens module 100 and irradiated to the image sensor 500.

Hereinafter, the first housing 200 of the present embodiment will be described with reference to FIGS. 2, 3, and 4. The first housing may be an exterior member of the camera module 1000. The first housing 200 may be a plastic injection mold. The first housing 200 may be hollow and an inner space may be formed thereby.

A first opening 221 may be formed in the lower portion of the first housing 200. The second housing 300 can be inserted through the first opening 221 of the first housing 200. A support portion 310 of the second housing 300 may be disposed inside the first housing 200. The first opening 221 of the first housing 200 can be closed by coupling with a base 320.

Therefore, airtightness inside the first housing 200 can be maintained. The substrate 400 fixed to the support portion 310 and an image sensor 500 can be accommodated in the first housing 200.

The first housing 200 may comprise a lens holder 210 and a body 220. The lens holder 210 and the main body 220 may be integrally formed. The body 220 may be in the form of a hollow block having an open bottom. The lens holder 210 may be disposed on the upper surface of the main body 220.

The lens holder 210 may be extended upward from the upper surface of the main body 220. The lens holder 210 may have a hollow cylindrical shape.

The lens module 100 may be mounted inside the lens holder 210. A thread may be formed on the inner side surface of the lens holder 210, and a thread may be formed on the outer side surface of the lens module 100. Therefore, the lens holder 210 and the lens module 100 can be screw-coupled. In this case, an adhesive is applied to the inner side surface of the lens holder 210 and the outer side surface of the lens module 100, and thermal curing may proceed further in some cases.

The lower end of the main body 220 may be in contact with the upper surface of the base 320 of the second housing 300. In this case, the lower end portion of the main body 220 and the upper surface of the base 320 may be laser welded. That is, the first housing 200 and the second housing 300 can be coupled by laser welding between the main body 220 and the base 320. As a result, the first opening 221 of the first housing 200 is closed by the base 320, and the inside of the first housing 200 can be sealed thereby.

Hereinafter, the second housing 300 of the present embodiment will be described with reference to FIGS. 3, 4, 5, and 6. The second housing 300 may be an exterior member of the camera module 1000. The second housing 300 may be a plastic injection mold. The substrate 400 may be disposed on the upper portion of the second housing 300. The substrate 400 may be fixed to the upper portion of the second housing 300. In this case, the substrate 400 can be insertion coupled with the second housing 300. In addition, an adhesive may be applied to the coupled portions of the second housing 300 and/or the substrate 400.

The second housing 300 may be inserted into the first housing 200 through a first opening 221 formed in a lower portion of the first housing 200. In this case, the second housing 300 can be upwardly inserted from the bottom. At least a portion of the second housing 300 may be disposed inside the first housing 200. The upper portion of the second housing 300 may be disposed inside the first housing 200.

The second housing 300 may include a support portion 310, a base 320, a cable accommodating portion 330, and hook parts 341, 342, 343, and 344. The support portion 310 may be disposed inside the first housing 200. A substrate 400 may be disposed on the support portion 310. The base 320 may be disposed below the support portion 310. The base 320 may close the first opening 221 of the first housing 200. The hook parts 341, 342, 343, and 344 may be disposed inside the first housing 200. The substrate 400 may be caught by the hook parts 341, 342, 343, and 344 so that the upward movement may be blocked.

The cable accommodating portion 330 may be disposed below the base 320. An external cable (not shown) may be accommodated in the cable accommodating portion 330. The cable may be electrically connected to a terminal provided in the cable accommodating portion 330. The terminal of the cable accommodating portion 330 may be electrically connected to the substrate 400 by a connector (not shown) or the like.

The cable may be a conductive line for electrically connecting the substrate 400 to an external electronic device (electronic control unit, power supply control unit, display unit). That is, the substrate 400 and the external electronic device can be electrically connected.

The electronic signal output from the image sensor 500 mounted on the substrate 400 can be transmitted to the electronic control unit through a cable. The signal converted in the electronic control unit can be reproduced as an image through the display unit.

An external power source may be controlled by the power control unit and supplied to the substrate 400. As a result, the camera module 1000 can be turned ON/OFF. A control signal may be transmitted to the substrate 400 through the electronic control unit. As a result, the electronic control unit can control the camera module 1000 to perform various electronic functions.

Hereinafter, the support portion 310, the base 320 and the hook parts 341, 342, 343, and 344 of the second housing 300 will be described in detail with reference to FIGS. 5 and 6. The support portion 310 functions to support and fix the substrate 400, and may be accommodated in the first housing 200. The base 320 functions to close the opening 221 of the first housing 200 and may be disposed below the support portion 310 to be exposed to the outside. The hook parts 341, 342, 343, and 344 function to hang and fix the board 400, and can be accommodated in the first housing 200.

The support portion 310 comprises a first support plate 311, a second support plate 312, a third support plate 313, a fourth support plate 314, corner parts 315, 316, 317, and 318, a first guide portion 315-1, the second guide portion 315-2, the third guide portion 316-1, the fourth guide portion 316-2, the fifth guide portion 317-1, the sixth guide portion 317-2, a seventh guide portion 318-1, and an eighth guide portion 318-2.

First, referring to FIG. 5, support plates 311, 312, 313, and 314, the corner parts 315, 316, 317, and 318 and the hook parts 341, 342, 343, and 344 will be described.

The first support plate 311, the second support plate 312, the third support plate 313 and the fourth support plate 314 may be extended upward from the base 320. The first support plate 311, the second support plate 312, the third support plate 313 and the fourth support plate 314 may be disposed inwardly from the upper surface of the base 320. As a result, the edge of the base 320 can be protruded outward.

Corner parts 315, 316, 317, and 318 may be disposed between the plurality of support plates 311, 312, 313, and 314. Edges of the substrate 400 may be seated in the corner parts 315, 316, 317, and 318. In this case, the lower surface of the substrate 400 and the upper portions of the corner parts 315, 316, 317, and 318 can be in contact with each other. The corner parts 315, 316, 317, and 318 may comprise a first edge 315, a second edge 316, a third edge 317 and a fourth edge 318.

The first support plate 311 and the third support plate 313 may be disposed opposite to each other. The second support plate 312 and the fourth support plate 314 may be disposed opposite to each other between the first support plate 311 and the third support plate 313.

The first support plate 311 and the second support plate 312 may be disposed inclined. The first support plate 311 and the second support plate 312 may be vertically disposed. The first edge 315 may be disposed between the first support plate 311 and the second support plate 312. The first edge 315 may be an edge formed where the first support plate 311 and the second support plate 312 meet. That is, the first support plate 311 and the second support plate 312 may be disposed inclined with respect to the first edge 315.

The second support plate 312 and the third support plate 313 may be disposed inclinedly. The second support plate 312 and the third support plate 313 may be vertically disposed. The second edge 316 may be disposed between the second support plate 312 and the third support plate 313. The second edge 316 may be an edge formed where the second support plate 312 and the third support plate 313 meet. That is, the second support plate 312 and the third support plate 313 may be inclined with respect to the second edge 316.

The third support plate 313 and the fourth support plate 314 may be disposed inclinedly. The third support plate 313 and the fourth support plate 314 may be vertically disposed. The third edge 317 may be disposed between the third support plate 313 and the fourth support plate 314. The third edge 317 may be an edge formed where the third support plate 313 and the fourth support plate 314 meet. That is, the third support plate 313 and the fourth support plate 314 may be inclined with respect to the third edge 317.

The fourth support plate 314 and the first support plate 311 may be disposed inclinedly. The fourth support plate 314 and the first support plate 311 may be vertically disposed. The fourth edge 318 may be disposed between the fourth support plate 314 and the first support plate 311. The fourth edge 318 may be an edge formed where the fourth support plate 314 and the first support plate 311 meet. That is, the fourth support plate 314 and the first support plate 311 may be inclined with respect to the fourth edge 318.

The substrate 400 can be supported by the first support plate 311, the second support plates 312, the third support plate 313, the fourth support plate 314, the first edge 315, the second edge 316, the third edge 317, and the fourth edge 318.

The upper end portion of the first support plate 311, the second support plate 312, the third support plate 313, the fourth support plate 314, the first edge 315, the second edge 316, the third edge 317, and the fourth edge 318 may be in contact with the lower surface of the substrate 400.

An adhesive may be applied to the point of contact between the substrate 400 and the first support plate 311, the second support plate 312, the third support plate 313, the fourth support plate 314, the first edge 315, the second edge 316, the third edge 317, and the fourth edge 318. The substrate 400 may be fixed to the upper end portion of the first support plate 311, the second support plate 312, the third support plate 313, the fourth support plate 314, the first edge 315, the second edge 316, the third edge 317, and the fourth edge 318 by the adhesive.

The first support plate 311 may comprise a first groove 311-1, a second groove 311-2, and a first protrusion 311-3. The first groove 311-1, the second groove 311-2 and the first protrusion 311-3 may be disposed at the upper end portion of the first support plate 311. The first groove 311-1 may be disposed on the fourth edge 318 side. The second groove 311-2 may be disposed on the first edge 315 side. The first groove 311-1 and the second groove 311-2 can be formed by recessing the upper end portion of the first support plate 311 downward.

The first protrusion 311-3 may be disposed between the first groove 311-1 and the second groove 311-2. The first protrusion 311-3 may be protruded upward from the upper surface of the first support plate 311. The width of the first groove 311-1 may be smaller than the width of the second groove 311-2. As a result, the first protrusion 311-3 can be disposed to be biased toward the fourth edge 318 side.

The second support plate 312 may comprise a third groove 312-1, a fourth groove 312-2, and a second protrusion 312-3. The third groove 312-1, the fourth groove 312-2, and the second protrusion 312-3 may be disposed at the upper end portion of the second support plate 312. The third groove 312-1 may be disposed on the first edge 315 side. The fourth groove 312-2 may be disposed on the second edge 316 side. The third groove 312-1 and the fourth groove 312-2 may be formed by recessing the upper end of the second support plate 312 downward.

The second protrusion 312-3 may be disposed between the third groove 312-1 and the fourth groove 312-2. The second protrusion 312-3 may be protruded upward from the upper surface of the second support plate 312. The width of the third groove 312-1 may be smaller than the width of the fourth groove 312-2. As a result, the second protrusion 312-3 can be disposed to be biased toward the first edge 315 side.

The third support plate 313 may comprise a fifth groove 313-1, a sixth groove 313-2, and a third protrusion 313-3. The fifth groove 313-1, the sixth groove 313-2 and the third protrusion 313-3 may be disposed at the upper end portion of the third support plate 313. The fifth groove 313-1 may be disposed on the second edge 316 side. The sixth groove 313-2 may be disposed on the third edge 317 side. The fifth groove 313-1 and the sixth groove 313-2 may be formed by recessing the upper end portion of the third support plate 313 downward.

The third protrusion 313-3 may be disposed between the fifth groove 313-1 and the sixth groove 313-2. The third protrusion 313-3 may be protruded upward from the upper surface of the third support plate 313. The width of the fifth groove 313-1 may be smaller than the width of the sixth groove 313-2. As a result, the third protrusion 313-3 can be disposed to be biased toward the second edge 316 side.

The fourth support plate 314 may comprise a seventh groove 314-1, an eighth groove 314-2, and a fourth protrusion 314-3. The seventh groove 314-1, the eighth groove 314-2 and the fourth protrusion 314-3 may be disposed at the upper end portion of the fourth support plate 314. The seventh groove 314-1 may be disposed on the third edge 317 side. The eighth groove 314-2 may be disposed on the fourth edge 318 side. The seventh groove 314-1 and the eighth groove 314-2 can be formed by recessing the upper end portion of the fourth support plate 314 downward.

The fourth protrusion 314-3 may be disposed between the seventh groove 314-1 and the eighth groove 314-2. The fourth protrusion 314-3 may be protruded upward from the upper surface of the fourth support plate 314. The width of the seventh groove 314-1 may be smaller than the width of the eighth groove 314-2. As a result, the fourth protrusion 314-3 may be disposed to be biased toward the third corner 317 side.

The hook parts 341, 342, 343, and 344 may be formed higher than the support portion 310. The first hook 341-1, the second hook 342-1, the third hook 343-1, and the fourth hook 344-1 may be disposed at the ends of the hook parts 341, 342, 343, and 344. The hook parts 341, 342, 343, and 344 may be disposed closer to the edge of the base 320 than the support portion 310. A plurality of hook parts 341, 342, 343, and 344 may be disposed so as to surround each side surface of the substrate 400 in a multiple numbers.

The first hook part 341 may be formed by being extended upward from the base 320. The first hook part 341 may be located outside the first support plate 311. That is, the first hook part 341 may be located closer to the edge of the base 320 than the first support plate 311.

The first hook part 341 may be extended above the first support plate 311. The first hook part 341 may be in the form of a rod having a first hook 341-1 disposed at an upper end thereof. The first hook 341-1 may be in contact with the upper surface of the substrate 400 in the form of a ring. That is, the first hook 341-1 may be formed to be higher than the first protrusion 311-3 and the first edge 315 on which the substrate 400 is seated, and the substrate 400 may be attached to the first hook 341-1 so that the upward movement can be blocked.

The first hook part 341 may be disposed to be deflected toward the first edge 315 side. The first hook part 341 may be disposed at a position corresponding to the second groove 311-2. The first hook part 341 may block the severe fluctuation of the substrate 400 in the vertical direction by complementing the first protrusion 311-3.

In the present embodiment, the first hook part 341 is disposed at a position corresponding to the second groove 311-2, but may be disposed at a position corresponding to the first protrusion 311-3. The second groove 311-2 and the first protrusion 311-3 may be disposed so that they are partially overlapped with the first hook part 341 in a direction horizontal to the optical axis. That is, it may be disposed at a position where the upper surface of the substrate 400 can be fixed at the upper side.

The second hook part 342 may be located outside the second support plate 312. That is, the second hook part 342 may be positioned closer to the edge of the base 320 than the second support plate 312.

The second hook part 342 may be extended above the second support plate 312. The second hook part 342 may be in the form of a rod having a second hook 342-1 disposed at an upper end portion thereof. The second hook 342-1 can be in contact with the upper surface of the substrate 400 in the form of a ring. The second hook 342-1 may be formed higher than the second protrusion 312-3 and the second edge 316 on which the substrate 400 is seated, and the substrate 400 may be caught by the second hook 342-1 so that the upward movement can be blocked.

The second hook part 342 may be disposed to be biased toward the second edge 316 side. The second hook part 342 may be disposed at a position corresponding to the fourth groove 312-2. Since the second protrusion 312-3 is disposed to be biased toward the first edge 315 side, the second hook part 342 may block the severe fluctuation of the substrate 400 in the vertical direction by complementing the second protrusion 312-3.

Although the second hook part 342 is disposed at a position corresponding to the fourth groove 312-2 in the present embodiment, the second hook part 342 may be disposed at a position corresponding to the second protrusion 312-3. In addition, the fourth groove 312-2 and the second protrusion 312-3 may be disposed so as to partially overlap with the second hook 342 in a horizontal direction with respect to the optical axis. That is, it may be disposed at a position where the upper surface of the substrate 400 can be fixed at the upper side.

The third hook part 343 may be located on the outer side of the third support plate 313. That is, the third hook part 343 may be positioned closer to the edge of the base 320 than the third support plate 313.

The third hook part 343 may be extended above the third support plate 313. The third hook part 343 may be in the form of a rod having a third hook 343-1 disposed at an upper end portion thereof. The third hook 343-1 can come into contact with the upper surface of the substrate 400 in the form of a ring. That is, the third hook 343-1 may be formed higher than the third protrusion 313-3 and the third edge 317 on which the substrate 400 is seated, and the substrate 400 may be caught by the third hook 343-1 so that the upward movement can be blocked.

The third hook part 343 may be disposed to be biased toward the third edge 317 side. The third hook part 343 may be disposed at a position corresponding to the sixth groove 313-2. The third hook part 343 may block the severe fluctuation of the substrate in the vertical direction by complementing the third protrusion 313-3.

Although the third hook part 343 is disposed at a position corresponding to the sixth groove 313-2 in the present embodiment, the third hook part 343 may be disposed at a position corresponding to the third protrusion 313-3. The sixth groove 313-2 and the third protrusion 313-3 may be disposed so that a part thereof overlaps with the third hook part 343 in a direction horizontal to the optical axis. That is, it may be disposed at a position where the upper surface of the substrate 400 can be fixed at the upper side.

The fourth hook part 344 may be located on the outer side of the fourth support plate 314. That is, the fourth hook part 344 may be located closer to the edge of the base 320 than the fourth support plate 314.

The fourth hook part 344 may be extended higher than the fourth support plate 314. The fourth hook part 344 may be in the form of a rod having a fourth hook 344-1 disposed at an upper end portion thereof. The fourth hook 344-1 may be in contact with the upper surface of the substrate 400 in the form of a ring. That is, the fourth hook 344-1 may be formed higher than the fourth protrusion 314-3 and the fourth edge 318 on which the substrate 400 is mounted, and the substrate 400 may be caught by the fourth hook 344-1 so that the upward movement can be blocked.

The fourth hook part 344 may be disposed to be biased toward the fourth edge 318 side. The fourth hook part 344 may be disposed at a position corresponding to the eighth groove 314-2. The fourth hook part 344 may block the severe fluctuation of the substrate 400 in the vertical direction by complementing the fourth protrusion 314-3.

In the present embodiment, the fourth hook part 344 is disposed at a position corresponding to the eighth groove 314-2, but may be disposed at a position corresponding to the fourth protrusion 314-3. In addition, the eighth groove 314-2 and the fourth protrusion 314-3 may be disposed so as to partially overlap with the fourth hook 344 in a horizontal direction with respect to the optical axis. That is, it may be disposed at a position where the upper surface of the substrate 400 can be fixed at the upper side.

The substrate 400 may be disposed between the support portion 310 and the first hook 341-1, the second hook 342-1, the third hook 343-1, and the fourth hook 344-1. The substrate 400 may be disposed at an area under the first hook 341-1, the second hook 342-1, the third hook 343-1, and the fourth hook 344-1, but above the first protrusion 311-3, the second protrusion 312-3, the third protrusion 313-3, and the fourth protrusion 314-3. In this case, the upper surface of the substrate 400 is in contact with the lower surfaces of the first hook 341-1, the second hook 342-1, the third hook 343-1, and the fourth hook 344-1. The lower surface of the substrate 400 can be in contact with the upper surfaces of the first protrusion 311-3, the second protrusion 312-3, the third protrusion 313-3, and the fourth protrusion 314-3.

The effects of the support plates 311, 312, 313 and 314, the corner parts 315, 316, 317 and 318, and the hook parts 341, 342, 343 and 344 will be described below.

First, blocking of the severe fluctuation of the substrate 400 in the vertical direction will be described. The lower surface of the substrate 400 is in contact with the upper end portions of the first protrusion 311-3, the second protrusion 312-3, the third protrusion 313-3, the fourth protrusion 314-3, the first edge 315, the second edge 316, the third edge 317, and the fourth edge 318, and the substrate 400 can be fixed as the upper surface thereof is caught by the first hook 341-1, the second hook 342-1, the third hook 343-1, and the fourth hook 344-1.

An adhesive may be applied to the contact area of the first protrusion 311-3, the second protrusion 312-3, the third protrusion 313-3, the fourth protrusion 314-3, the first edge 315, the second edge 316, the third edge 317, the fourth edge 318, the first hook 341-1, the second hook 342-1, the third hook 343-1, and the fourth hook 344-1.

The corner part of the substrate 400 can be stably supported by the first edge 315, the second edge 316, the third edge 317, and the fourth edge 318 which are properly disposed.

The side portions of the substrate 400 are supported by the first protrusion 311-3, the second protrusion 312-3, the third protrusion 313-3, and the fourth protrusion 314-3, which are biasedly disposed, but this is complemented by the first hook 341-1, the second hook 342-1, the third hook 343-1, and the fourth hook 344-1, which are biasedly disposed in opposition to the first protrusion 311-3, the second protrusion 312-3, the third protrusion 313-3, and the fourth protrusion 314-3, so that it may be possible to cope with the severe fluctuation in the vertical direction.

The first protrusion 311-3 and the third protrusion 313-3 facing each other may be disposed in a point symmetry with respect to the center of gravity of the substrate 400. Also, the second protrusion 312-3 and the fourth protrusion 313-4 facing each other may be disposed in a point symmetry with respect to the center of gravity of the substrate 400. Therefore, despite the biased arrangement of the first protrusion 311-3, the second protrusion 312-3, the third protrusion 313-3, and the fourth protrusion 314-3, the substrate 400 can be stably maintained in the correct position.

Hereinafter, blocking the tilting of the substrate 400 will be described. An external force may act in the vertical direction (z-axis direction) as it is biased to the center of gravity of the substrate 400. In this case, the substrate 400 may be tilted due to a rotational momentum applied thereto. When the substrate 400 is tilted, a force acting downward and a force acting upwards may appear biased at the center of gravity of the substrate 400.

For example, when an external force is acting to press the substrate 400 in the first quadrant, a downward force acts on the substrate 400 disposed in the first quadrant, and an upward force is acting to the substrate 400 disposed in the third quadrant. The downward force is canceled as the substrate 400 is supported by the second protrusion 312-3, the third protrusion 313-3, and the second edge 316 located at the first quadrant, and the upward force is canceled as the substrate 400 is fixed by the fourth hook 344-1 located at the third quadrant. The tilting of the substrate 400 can be stably blocked by the biased arrangement of the second protrusion 312-3, the third protrusion 313-3, and the fourth hook 344-1.

That is, the biased arrangement of the protrusions and the hook part is effective in preventing the tilting of the substrate 400. It is also possible to prevent the bending phenomenon of the substrate 400 in the counteracting process of the substrate 400 against the rotational moment.

In summarizing above description, the camera module 1000 of the present embodiment effectively blocks vertical movement (movement along the z-axis direction) and tilting of the substrate 400.

Hereinafter, referring to FIG. 6, guide portions 315-1, 315-2, 316-1, 316-2, 317-1, 317-2, 318-1, and 318-2 will be described.

The first guide portion 315-1 and the second guide portion 315-2 may be extended upward from the base 320. The first guide portion 315-1 and the second guide portion 315-2 may be located outside the first edge 315. That is, the first guide portion 315-1 and the second guide portion 315-2 may be disposed closer to the edge of the base 320 than the first edge 315.

The first guide portion 315-2 and the second guide portion 315-2 may be inclined with respect to the first edge 315. The first guide portion 315-1 and the second guide portion 315-2 may be disposed to be orthogonal to each other with respect to the first edge 315. That is, the inclination angles of the first guide portion 315-1 and the second guide portion 315-2 may be a right angle with respect to the first edge 315.

The inner side surfaces of the upper portion of the first guide portion 315-1 and the second guide portion 315-2 can be in contact with the outer side surfaces of the corner of the substrate 400. An adhesive may be applied to the contact portion between the first guide portion 315-1 and the second guide portion 315-2 and the substrate 400. The first guide portion 315-1 and the second guide portion 315-2 can block the horizontal movement of the substrate 400 (movement along the x-axis, y-axis direction).

A first inclined portion 315-3 inclined downward in the inward direction may be disposed on the upper end portion of the first guide portion 315-1. A first inclined portion 315-3 inclined downward toward the second support plate 312 may be disposed on the upper end portion of the first guide portion 315-1.

A second inclined portion 315-4 inclined downward in the inward direction may be disposed on the upper end portion of the second guide portion 315-2. The second inclined portion 315-4 inclined downward toward the first support plate 311 may be disposed on the upper end portion of the second guide portion 315-2.

The third guide portion 316-1 and the fourth guide portion 316-2 may be extended upward from the base 320. The third guide portion 316-1 and the fourth guide portion 316-2 may be located outside the second edge 316. That is, the third guide portion 316-1 and the fourth guide portion 316-2 may be disposed closer to the edge of the base 320 than the second edge 316.

The third guide portion 316-1 and the fourth guide portion 316-2 may be inclined with respect to the second edge 316. The third guide portion 316-1 and the fourth guide portion 316-2 may be disposed to be orthogonal to each other with respect to the second edge 316. That is, the inclination angles of the third guide portion 316-1 and the fourth guide portion 316-2 may be right angles with respect to the second edge 316.

The inner side surfaces of the upper portion of the third guide portion 316-1 and the fourth guide portion 316-2 can be in contact with the outer side surfaces of the corner of the substrate 400. An adhesive may be applied to the contact portions between the third guide portion 316-1 and the fourth guide portion 316-2 and the substrate 400. The third guide portion 316-1 and the fourth guide portion 316-2 can block horizontal movement of the substrate 400 (movement along the x-axis and y-axis direction).

A third inclined portion 316-3 inclined downward in the inward direction may be disposed at the upper end portion of the third guide portion 316-1. A third inclined portion 316-3 inclined downward toward the second support plate 312 may be disposed on the upper end of the third guide portion 316-1.

A fourth inclined portion 316-4 inclined downward in the inward direction may be disposed on the upper end portion of the fourth guide portion 316-2. The fourth inclined portion 316-4 inclined downward toward the third support plate 313 may be disposed on the upper end portion of the fourth guide portion 316-2.

A fifth guide portion 317-1 and a sixth guide portion 317-2 may be extended upward from the base 320. The fifth guide portion 317-1 and the sixth guide portion 317-2 may be located outside the third corner 317. That is, the fifth guide portion 317-1 and the sixth guide portion 317-2 may be disposed closer to the edge of the base 320 than the third edge 317.

The fifth guide portion 317-1 and the sixth guide portion 317-2 may be inclined from each other with respect to the third corner 317. The fifth guide portion 317-1 and the sixth guide portion 317-2 may be disposed to be orthogonal to each other with respect to the third corner 317. That is, the inclination angles of the fifth guide part 317-1 and the sixth guide part 317-2 may be right angles with respect to the third edge 317.

The inner side surfaces of the upper portion of the fifth guide portion 317-1 and the sixth guide portion 317-2 can be in contact with the outer side surfaces of the corner of the substrate 400. An adhesive may be applied to the contact portions between the fifth guide portion 317-1 and the sixth guide portion 317-2 and the substrate 400. The fifth guide portion 317-1 and the sixth guide portion 317-2 can block horizontal movement of the substrate 400 (movement along the x-axis, y-axis direction).

A fifth inclined portion 317-3 inclined downward in the inward direction may be disposed on the upper end portion of the fifth guide portion 317-1. The fifth inclined portion 317-3 inclined downward toward the fourth support plate 314 may be disposed on the upper end portion of the fifth guide portion 317-1.

A sixth inclined portion 317-4 inclined downward in the inward direction may be disposed on the upper end portion of the sixth guide portion 317-2. The sixth inclined portion 317-4 inclined downward toward the third support plate 313 may be disposed on the upper end portion of the sixth guide portion 317-2.

The seventh guide portion 318-1 and the eighth guide portion 318-2 may be extended upward from the base 320. The seventh guide portion 318-1 and the eighth guide portion 318-2 may be located outside the fourth edge 318. That is, the seventh guide portion 318-1 and the eighth guide portion 318-2 may be disposed closer to the edge of the base 320 than the fourth edge 318.

The seventh guide portion 318-1 and the eighth guide portion 318-2 may be inclined from each other with respect to the fourth edge 318. The seventh guide portion 318-1 and the eighth guide portion 318-2 may be disposed to be orthogonal to each other with respect to the fourth edge 318. That is, the inclination angles of the seventh guide portion 318-1 and the eighth guide portion 318-2 may be right angles with respect to the fourth edge 318.

The inner side surfaces of the upper portion of the seventh guide portion 318-1 and the eighth guide portion 318-2 may be in contact with the outer surfaces of the corner of the substrate 400. An adhesive may be applied to the contact portion between the seventh guide portion 318-1 and the eighth guide portion 318-2 and the substrate 400. The seventh guide portion 318-1 and the eighth guide portion 318-2 can block horizontal movement of the substrate 400 (movement along the x-axis, y-axis direction).

A seventh inclined portion 318-3 inclined downward in the inward direction may be disposed on the upper end portion of the seventh guide portion 318-1. The seventh inclined portion 318-3 inclined downward toward the fourth support plate 314 may be disposed on the upper end portion of the seventh guide portion 318-1.

An eighth inclined portion 318-4 inclined downward in the inward direction may be disposed at the upper end portion of the eighth guide portion 318-2. The eighth inclined portion 318-4 inclined downward toward the first support plate 311 may be disposed at the upper end portion of the eighth guide portion 318-2.

Hereinafter, the effects of guide portions 315-1, 315-2, 316-1, 316-2, 317-1, 317-2, 318-1, and 318-2 will be described. When the substrate 400 is insertion coupled to the support portion 320, the edge of the substrate 400 may be moved downward being guided by a first inclined portion 315-3, a second inclined portion 315-4, a third inclined portion 316-3, the fourth inclined portion 316-4, the fifth inclined portion 317-3, the sixth inclined portion 317-4, the seventh inclined portion 318-3, and the eighth inclined portion 318-4.

The lower surface of the guided substrate 400 may be in contact with the upper end portion of the first protrusion 311-3, the second protrusion 312-3, the third protrusion 313-3, the fourth protrusion 313-4, the first edge 315, the second edge 316, the third edge 317, and the fourth edge 318. Therefore, the substrate 400 can be supported by the first protrusion 311-3, the second protrusion 312-3, the third protrusion 313-3, the fourth protrusion 313-4, the first edge 315, the second edge 316, the third edge 317, and the fourth edge 318.

The outer side surface of the edge of the guided substrate 400 may be in contact with the inner side surfaces of the first guide portion 315-1, the second guide portion 315-2, the third guide portion 316-1, the fourth guide portion 316-2, the fifth guide portion 317-1, the sixth guide portion 317-2, the seventh guide portion 318-1, and the eighth guide portion 318-2. Accordingly, the substrate 400 can be insertion coupled with the first guide portion 315-1, the second guide portion 315-2, the third guide portion 316-1, the fourth guide portion 316-2, the fifth guide portion 317-1, the sixth guide portion 317-2, the seventh guide portion 318-1, and the eighth guide portion 318-2.

In summarizing above description, the guide portions 315-1, 315-2, 316-1, 316-2, 317-1, 317-2, 318-1, and 318-2 guide the substrate 400 so as to be stably settled down on the support portion 310, and press the substrate 400 so that it may be stably fixed.

The substrate 400 may be disposed inside the first housing 200. The substrate 400 may be mounted on the support portion 310 of the second housing 300. The substrate 400 may be disposed inside the first housing 200 as the support portion 310 is being inserted into the first housing 200. The substrate 400 may be a printed circuit board (PCB). The image sensor 500 may be mounted on the substrate 400.

The substrate 400 may be electrically connected to a cable to receive power or control signals of an external electronic device. In addition, the electronic image signal output from the image sensor 500 can be transmitted to an external electronic device.

Although not shown, a first connector (not shown) may be disposed on the rear surface of the substrate 400 on which the image sensor 500 is not disposed. The second connector 319 is disposed on the upper side of the base 320 and may be disposed inside the support portion 310. The image signal output from the image sensor 500 may be transmitted to the vehicle or the like through the second connector 319. The height of each edge on which the board 400 is seated can be changed according to the coupling structure of the first connector (not shown) of the board 400 and the second connector 319 disposed in the second housing 300.

In the present embodiment, one substrate 400 has been described, but the present invention is not limited thereto. A plurality of substrates may be provided, and a plurality of substrates may be stacked and disposed with a gap therebetween. In this case, the substrate on which the image sensor 500 is mounted is mounted on the upper portion of the support portion 310, and the remaining substrate may be accommodated in the space formed by the first support plate 311, the second support plate 312, the third support plate 313, and the fourth support plate. The substrate placed inside the first support plate 311, the second support plate 312, the third support plate 313, and the fourth support plate 314 may be double protected twice by the main body 220 of the first housing 200 and the first support plate 311, the second support plate 312, the third support plate 313, and the fourth support plate 314.

The image sensor 500 may be disposed inside the first housing 200. The image sensor 500 may be mounted on the substrate 400. The image sensor 500 may be disposed in alignment with the optical axis of the lens module 100. As a result, the light transmitted through the lens module 100 can be irradiated to the image sensor 500. The image sensor 500 can convert the obtained light into a digital signal. The image sensor 500 may be a charge coupled device (CCD), a metal oxide semi-conductor (MOS), a CPD, and a CID. However, the type of the image sensor 500 is not limited thereto.

Ribs 221 are in contact with the upper surface of the base 320 and side walls 321 are located outside the ribs 221 to cover the ribs 221. The first housing 200 may be made of a laser transmissive material and the second housing 300 may be made of a laser absorbing material.

When the laser is irradiated on the base 320 which overlaps with the ribs 221 in the vertical direction, the laser is transmitted through the base 320 and absorbed by the ribs 221. Therefore, the contact portion between the rib 221 and the base 320 can be melted and fused by the laser.

The arrangement and spacing between the ribs 221 and the side walls 321 are important for laser welding. The length of the rib 221 in the vertical direction (a in FIG. 7) is preferably 0.8 mm, and the tolerance between the rib 221 and the side wall 321 (b in FIG. 7) is preferably 0.3 mm. This is because the ribs 221 melt and shrink as a whole. The thickness of the base 320 (c in FIG. 7) is preferably 1.2 mm, and the width of the side wall 321 (d in FIG. 7) is preferably 0.5 mm considering the laser permeability and durability. It is preferable that the tolerance (e in FIG. 7) between the inner side surface of the side wall 321 and the outer side surface of the rib 221 is 0.2 mm in order to stably accommodate the molten rib 221 and the base 320 during the fusion process. It is preferable that the width of the contact portion between the rib 221 and the base 320 (f in FIG. 7) is secured to 1 mm for the bonding strength and airtightness. It is preferable that the assembly tolerance (g in FIG. 7) between the first housing 200 and the second housing 300 is 0.1 mm.

In the above, to have been described as all the components that make up the embodiments of the present invention may operate in combination, or combined into one, the present invention is not necessarily limited to all the components of the embodiments. That is, the present invention may comprise one or more of all the components of the embodiments and be operated through these components. In addition, the term "comprise" described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

The invention claimed is:

1. A camera module comprising:
a first housing in which a lens module is disposed;
a second housing including a base and a support portion extending upward from an upper surface of the base in an upward direction toward the lens module; and
a hook part extending from the base to more upward than the support portion,
wherein the support portion comprises a first support plate extending from the base to provide a side,
wherein the first support plate comprises a first protrusion disposed at an upper end portion of the first support plate, a first groove and a second groove disposed respectively at both side of the first protrusion,
wherein the hook part comprising a hook at end portion thereof is disposed on an upper surface of a substrate of the lens module,
wherein the hook part is disposed at a position corresponding to the second groove, and
wherein a lower surface of the first housing is in contact with the upper surface of the base, and the substrate and the support portion are disposed within an inner space of the first housing.

2. The camera module according to claim 1, wherein the support portion comprises:
the first support plate extending from the base to provide a first side; and
a second support plate disposed perpendicularly to the first support plate and extending from the base to provide a second side.

3. The camera module according to claim 2, further comprising a corner part connecting the first support plate and the second support plate.

4. The camera module according to claim 1, wherein the hook is in contact with the upper surface of the substrate.

5. The camera module according to claim 4, wherein the substrate is disposed between the hook and the support portion.

6. The camera module according to claim 1, wherein a plurality of hook parts are disposed so as to surround respective side surfaces of the substrate.

7. The camera module according to claim 1, wherein the second housing includes a cable accommodating portion protruding in a downward direction from a lower surface of the base, the downward direction is different than the upward direction.

8. The camera module according to claim 1, wherein the base and the first housing are bonded by fusion welding.

9. The camera module according to claim 1, wherein the support portion supports a lower surface of the substrate.

10. The camera module according to claim 1, wherein the corner part supports the side surface of the substrate.

11. The camera module according to claim 1, wherein the hook part supports the upper surface of the substrate.

12. A vehicle comprising:
a body;
one or more doors mounted to the body;
a display unit disposed inside of the body; and
a camera module disposed on at least one of the body or one or more doors and electrically connected to the display unit,
wherein the camera module comprises:
a first housing in which a lens module is disposed, the first housing having an opening formed by a lower surface of the first housing;
a second housing including a base and a support portion extending in an upward direction from an upper surface of the base; and
a hook part extending from the base to more upward than the support portion,
wherein the support portion comprises a first support plate extending from the base to provide a side,
wherein the first support plate comprises a first protrusion disposed at an upper end portion of the first support plate, a first groove and a second groove disposed respectively at both side of the first protrusion,
wherein the hook part comprising a hook at end portion thereof is disposed on an upper surface of a substrate of the lens module,
wherein the hook part is disposed at a position corresponding to the second groove, and
wherein the lower surface of the first housing is in contact with the upper surface of the base, and the substrate and the support portion are disposed within an inner space of the first housing.

13. The vehicle according to claim 12, wherein the support portion comprises:
the first support plate extending from the base to provide a first side;
a second support plate disposed perpendicularly to the first support plate and extending from the base to provide a second side; and
a corner part connecting the first support plate and the second support plate.

14. The vehicle according to claim 12, wherein the hook is in contact with the upper surface of the substrate.

15. The vehicle according to claim 14, wherein the substrate is disposed between the hook and the support portion.

16. The vehicle according to claim 12, wherein a plurality of hook parts are disposed so as to surround respective side surfaces of the substrate.

17. The camera module according to claim 1, wherein the first groove and the second groove are formed by recessing the upper end portion of the first support plate downward.

18. The camera module according to claim 1, wherein a width of the first groove is smaller than a width of the second groove.

19. The vehicle according to claim 12, wherein the first groove and the second groove are formed by recessing the upper end portion of the first support plate downward.

20. The vehicle according to claim 12, wherein a width of the first groove is smaller than a width of the second groove.

* * * * *